United States Patent
Auer

(10) Patent No.: US 7,258,182 B2
(45) Date of Patent: Aug. 21, 2007

(54) DEVICE AND METHOD FOR CONTINUOUS REGULATION OF THE ERECTION OF A TANDEM AXLE

(75) Inventor: Ernst Auer, Munich (DE)

(73) Assignee: NAF Neukirchener Achsenfabrik AG, Neunkirchen (DE)

( * ) Notice: Subject to any disclaimer, the term of this patent is extended or adjusted under 35 U.S.C. 154(b) by 311 days.

(21) Appl. No.: 11/114,588

(22) Filed: Apr. 26, 2005

(65) Prior Publication Data

US 2006/0237243 A1    Oct. 26, 2006

(51) Int. Cl.
*F16H 59/026*    (2006.01)
(52) U.S. Cl. .................. 180/24.11; 180/24; 180/343; 474/28
(58) Field of Classification Search ......... 180/24.11, 180/24, 343; 474/28
See application file for complete search history.

(56) References Cited

U.S. PATENT DOCUMENTS

| | | | | |
|---|---|---|---|---|
| 3,414,072 | A | * | 12/1968 | Hodges, Jr. et al. .......... 180/24 |
| 3,442,345 | A | * | 5/1969 | Berger ..................... 180/24.11 |
| 3,786,888 | A | * | 1/1974 | Nelson .................... 180/24.11 |
| 5,417,297 | A | * | 5/1995 | Auer ....................... 180/24.11 |
| 5,711,730 | A | * | 1/1998 | Friedman et al. ............ 474/18 |
| 6,053,837 | A | * | 4/2000 | Auer .......................... 475/221 |

FOREIGN PATENT DOCUMENTS

| DE | 195 44 644 A1 | 6/1996 |
|---|---|---|
| DE | 196 16 405 A1 | 10/1997 |
| DE | 202 17 910 U1 | 2/2003 |

* cited by examiner

*Primary Examiner*—Paul N. Dickson
*Assistant Examiner*—Timothy Wilhelm
(74) *Attorney, Agent, or Firm*—Womble Carlyle Sandridge & Rice, PLLC

(57) ABSTRACT

The present invention relates to a device for continuously regulating the erection of a tandem axle of a vehicle or a self-moving working machine having a vehicle frame and at least one drive axle, wherein a tandem drive axle with a movable tandem axle housing is respectively disposed at the ends of the drive axle, and the torque introduced by the drive axle is mechanically distributed to the wheels disposed in the tandem axle housing through the drive tandem axle. Therein, the drive axle is coaxially connected to the drive tandem axle through a ball ramp device, wherein the ball ramp device is comprised of a first ball ramp disk connected to an end of the drive tandem axle opposing an end of the drive axle, and a second ball ramp disk disposed in an axially displaceable manner at the end of the drive tandem axle, and the distance L between the second ball ramp disk and the first ball ramp disk is increased by a torque of the drive tandem axle counteracting the drive torque, wherein the second ball ramp disk is operatively connected to a piston, and a pressure with a value of P1 is produced in a volume by the axial movement of the second ball ramp disk, wherein P1 is passed to a control valve, and the control valve controls the level of a system pressure P3 or P4 depending on P1, and a resulting pressure with the value of P2 serves for controlling a compensating device for achieving a compensating torque counteracting the erection effect. The invention further relates to a method for continuously regulating the erection of a tandem axle of a vehicle or a self-moving working machine.

14 Claims, 2 Drawing Sheets

DEVICE AND METHOD FOR CONTINUOUS REGULATION OF THE ERECTION OF A TANDEM AXLE

BACKGROUND OF THE INVENTION

The present invention relates to a device for continuously regulating the erection of a drive tandem axle of a vehicle or a self-moving working machine having a vehicle frame and at least one drive axle, wherein a drive tandem axle having a movable tandem axle housing is respectively disposed at the ends of the drive axle, and the torque introduced by the drive axle is mechanically distributed through the drive tandem axle to the wheels disposed in the tandem axle housing. The invention further relates to a method for continuous regulation of the erection of a tandem axle of a vehicle or a self-moving working machine.

Such devices for regulating the erection of a drive tandem axle of a vehicle or a self-moving working machine are known. Tandem axles or also boogie axles have the disadvantage that the axle beam erects more or less independently of transmission ratios and the geometrical ratios when a torque is introduced. Thereby, non-uniform distribution of the wheel load between the front and rear wheels results, which are disposed at the respective ends of the axle beams.

Thereby, it occurs that at least one of the wheels loses road grip or the load on soil is greatly reduced, respectively. Since the described tandem axles are mainly used in forest machines, tipping trucks and graders, which especially operate in pathless terrain, this results in great restrictions during operation of the corresponding vehicles and in different tire wear.

In order to prevent the mentioned erection effect, in known devices, a transmission of 1:1 or nearly 1:1 is used in the axle beam. However, this is disadvantageous in that the components within the axle beam have to transmit a high torque and thus are appropriately largely dimensioned. Therefore, such axle beams become very expensive, heavy and lose ground clearance. Further known devices for preventing an erection effect of a tandem axle use a double planetary gearing or a measuring gearing and use the back torque thereof to reduce the erection effect. Corresponding devices are described in DE-A1-19802371 and in DE-A1-4120801. However, these devices are disadvantageous in that the back torque is not able to be adjusted in its magnitude and is always proportional to the input torque. An erection effect, which can also be desirable in some driving situations, is not able to be caused. The front or rear wheel of the tandem axle, respectively, is not able to be intentionally lifted by this mechanism.

Another device known from the prior art is described in DE-A1-19616405. This device uses hydraulic cylinders attached externally between a tandem box and the vehicle frame and pressurized with pressure that is switched proportionally to the operational pressure of a driving hydraulic motor. However, this is disadvantageous in that the external hydraulic cylinders are susceptible, since they are exposed to the environmental influences. Additionally, the installation between vehicle frame and tandem beam is expensive and restricts the independent freedom of movement of the tandem axle. Distinct control of the left and right sides is not possible.

Finally, DE-U1-20217910 describes a device for regulating the erection of a tandem axle, wherein a housing of a pressurizable rotary piston cylinder is fixedly connected to an axle housing of a drive axle, and a movable piston of the rotary piston cylinder drives a succeeding planetary gearing having a planetary axle and planet pinions, wherein the planetary axle of the planetary gearing is fixedly connected to the axle housing or the housing of the rotary piston cylinder, and the planet pinions act on a toothed wheel connected to a tandem axle housing. By interposing a rotary piston cylinder and the planetary gearing succeeding the rotary piston cylinder, it is possible to exert a predefined pressure on the tandem axle housing and to either counteract an erection effect of the tandem axle or to perform active lift of the tandem axle. Therein, the rotational direction of the rotary piston is reversed by the planetary gearing upon pressurization such that corresponding counter-torques act on the tandem axle housing. However, this device is disadvantageous in that also herein the predefined and controllable pressure is always in a fixed ratio to a theoretically occurring erection torque. Separate regulation of the erection effect of the individual tandem axles considering the respectively occurring actual torques is not possible.

Therefore, it is the object of the present invention to provide a device and a method for continuous regulation of the erection of a tandem axle of a vehicle or a self-moving working machine, which reliably prevents the unwanted erection of the tandem axle to a predeterminable extent on the one hand, and allows for separate regulation of the erection effect of the individual tandem axles considering the respectively occurring actual torques on the other hand.

This object is solved by a device and a method for continuous regulation of the erection of a tandem axle having the features of the independent claims 1 and 11.

Advantageous developments are described in the respective dependent claims.

SUMMARY OF THE INVENTION

In an inventive device for regulating the erection of a tandem axle of a vehicle or a self-moving working machine, a drive axle is coaxially connected to a drive tandem axle through a ball ramp device, wherein the ball ramp device is comprised of a first ball ramp disk connected to an end of the drive tandem axle opposing an end of the drive axle, and a second ball ramp disk disposed in axially displaceable manner at the end of the drive tandem axle. The distance L between the second ball ramp disk and the first ball ramp disk is increased by a torque of the drive tandem axle counteracting the drive torque, wherein the second ball ramp disk is operationally connected to a piston, and a pressure with a value of P1 is produced in a volume by the axial movement of the second ball ramp disk, wherein P1 is passed to a control valve, and the control valve controls the level of a system pressure P3 or P4 depending on P1, and this resulting pressure with the value of P2 serves for controlling a compensating device for achieving a compensating torque counteracting the erection effect. Therein, the control valve is usually connected to a hydraulic circuit of a hydraulic pump of the vehicle or the self-moving working machine. However, it is also conceivable that an own, separate hydraulic circuit serves for controlling the compensating device. By measuring the torque of the drive tandem axle counteracting the drive torque through the ball ramp device, i.e. converting a torque into an axial movement, and producing a control pressure P1, it is possible to reliably prevent the unwanted erection of the tandem axle to a predeterminable extent, and additionally to allow for separate regulation of the erection effect of the individual tandem axles considering the respectively occurring current and actual torques. Therein, the resulting pressure P2 serving for controlling the compensating device, is directly dependent on (proportional to) the measured pressure P1.

In an advantageous development of the invention, the control valve is a controllable or non-controllable proportional valve. Thereby, it is possible to preadjust the level of the pressure introduced into the control valve by the hydraulic system according to the requirement. Therein, this adjustment can be effected once or continuously.

In another advantageous development of the invention, in the hydraulic circuit, at least one controlling and adjusting device for manually preadjusting the relative level of the compensating torque for regulating the erection effect of the tandem axle precedes the control valve. Usually, the controlling and adjusting device is a pressure-reducing valve. By the controlling and adjusting device, it is possible that a compensating torque of between 0 and 100% can be adjusted according to the driving situation. Therein, 100% of compensation mean the same wheel load on the front and rear wheels in every driving situation. 0% of compensation means no compensation, hence an erection effect to full extent, thereby simulating a situation without the device according to the invention. Therein, the extent of the compensating effect for regulating the erection of the tandem axle is manually or automatically adjustable with the controlling and adjusting device.

In another advantageous development of the invention, the compensating device is a rotary piston cylinder assembly, wherein a housing of a pressurizable rotary piston cylinder is fixedly connected to an axle housing of the drive axle, and a movable piston of the rotary piston cylinder drives a succeeding planetary gearing with a planetary axle and planet pinions, wherein the planetary axle of the planetary gearing is fixedly connected to the axle housing or the housing of the rotary piston cylinder, and the planet pinions act on a toothed wheel connected to the tandem axle housing. By interposing a rotary piston cylinder and the planetary gearing succeeding the rotary piston cylinder, it is possible to exert the introduced pressure P2 on the tandem axle housing. Therein, the rotational direction of the rotary piston is reversed by the planetary gearing upon pressurization such that corresponding counter-torques act on the tandem axle housing.

In another advantageous development of the invention, the compensating device is a rack rotary cylinder device with connected planetary gearing for introducing the torque of the compensating effect into the tandem axle.

In another advantageous development of the invention, the compensating device is comprised of two external cylinders, wherein the cylinders are also attached with one end to the tandem axle housing and with the other end to a chassis of the vehicle or the self-moving working machine.

An inventive method for regulating the erection of a tandem axle of a vehicle or a self-moving working machine includes the following steps: (a) introducing a drive torque through a drive axle and a coaxial drive tandem axle and mechanically distributing the introduced torque to the wheels disposed in a tandem axle housing, wherein the drive axle is connected to the drive tandem axle through a ball ramp device, and the ball ramp device is comprised of a first ball ramp disk connected to an end of the drive tandem axle opposing an end of the drive axle, and a second ball ramp disk disposed in axially displaceable manner at the end of the drive axle; (b) measuring a torque of the drive tandem axle counteracting the drive torque by means of a pressure with a value of P1 produced by a piston, wherein the piston is operatively connected to the second ball ramp disk; (c) passing the pressure P1 to a control valve; and (d) regulating the level of the system pressure P3 or P4 depending on P1 and introducing the resulting pressure with a value of P2 into a compensating device for achieving a compensating torque counteracting the erection effect. By the method according to the invention, it is possible to reliably modify the unwanted erection of the tandem axle to a predeterminable extent on the one hand, and to allow for separate regulation of the erection effect of the individual tandem axles considering the respectively occurring torques on the other hand. By measuring the actually occurring torque opposing the drive torque, of the so-called erection effect through the ball ramp device and the piston operatively connected thereto with production of a control pressure P1, continuous transmission and monitoring of the actual erection effect and compensation thereof are possible.

In an advantageous development of the method according to the invention, the control valve is a proportional valve. Additionally, at least one controlling and adjusting device for manually preadjusting the relative magnitude of the compensating torque for regulating the erection effect of the tandem axle can be disposed at the control valve.

In further advantageous developments of the method according to the invention, the compensating device is a rotary piston cylinder assembly with connected planetary gearing or a rack rotary cylinder device with connected planetary gearing, or is comprised of two external cylinders, wherein the cylinders are each attached with one end to the tandem axle housing and with the other end to a chassis of the vehicle or the self-moving working machine, each for introducing the torque of the compensating effect into the tandem axle.

BRIEF DESCRIPTION OF THE DRAWINGS

Further details, features and advantages of the invention result from the following description of an embodiment schematically represented in the figures.

DETAILED DESCRIPTION OF THE PREFERRED EMBODIMENT

Figure 1:
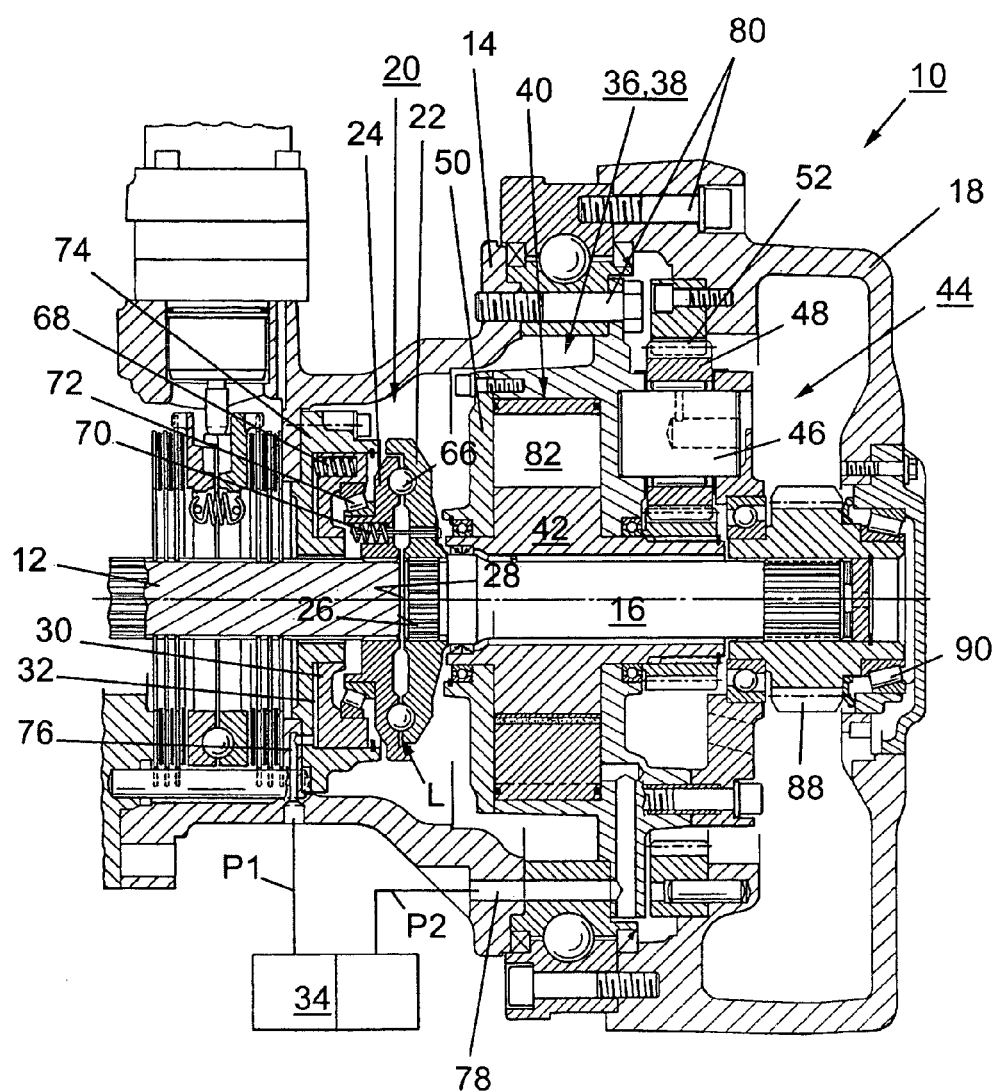
FIG. 1 a sectional view of the device according to the invention for continuously regulating the erection of a tandem axle of a vehicle or a self-moving working machine.

FIG. 1 shows a sectional view of an embodiment of the device 10 for continuously regulating the erection of a tandem axle of a vehicle or a self-moving working machine. Therein, the vehicle has a vehicle frame (not shown), on which an axle housing 14 of a drive axle 12 is disposed. At the respective ends of the drive axle 12, a drive tandem axle 16 having a movable tandem axle housing 18 is respectively positioned. Through the drive tandem axle 16, the torque introduced by the drive axle 12 is mechanically distributed to the wheels 84, 86 (see FIG. 2) disposed in the tandem axle housing. One recognizes that the drive axle 12 is coaxially connected to the drive tandem axle 16 through a ball ramp device 20. Therein, the ball ramp device 20 is comprised of a first ball ramp disk 22 connected to an end 26 of the drive tandem axle 16 opposing an end 28 of the drive axle 12, and a second ball ramp disk 24 disposed in axially displaceable manner at the end 28 of the drive tandem axle. The mutually opposing areas of the first and second ball ramp disks 22, 24 have corresponding recesses for receiving the balls 66. Therein, the length and the inclination of the recesses are individually configurable.

Furthermore, one recognizes from FIG. 1 that the distance L between the second ball ramp disk 24 and the first ball ramp disk 22 is increased by a torque of the drive tandem axle 16 counteracting the drive torque, wherein the second ball ramp disk is operatively connected to a piston 30, and a pressure with a value of P1 is produced in a volume 32 by the axial movement of the second ball ramp disk 24 along the drive axle 12. The pressure P1 is passed to a control valve 34 through a bore 76. The control valve 34 controls the level of a system pressure P3 or P4 depending on P1, wherein the resulting pressure with the value of P2 serves for controlling a compensating device 36 for achieving a compensating torque counteracting the erection effect.

The first ball ramp disk 22 is axially supported by the axle 16 and a gear 88 and a bearing 90 on the tandem axle housing 18. The second ball ramp disk 24 is axially displaceable along the drive axle 12 on the one hand and through a cohesion spring 70 to the first ball ramp disk 22. Through corresponding bearings 72, the second ball ramp disk 24 is operatively connected to the piston 30. A loading spring 68 is formed within the piston 30, which is supported with respect to a piston housing 74 and serves for returning the piston 30 into its initial position. Additionally, it provides for axially biasing the ball roller bearing.

The control valve 34, which is formed as a controllable proportional valve in the illustrated embodiment, controls the pressure P2 for controlling the compensating device 36. In the illustrated embodiment, the compensating device 36 is comprised of a rotary piston cylinder assembly 38, wherein the housing 50 of a pressurizable rotary piston cylinder 40 is fixedly connected to the axle housing 14 of the drive axle 12. A rotationally movable piston 42 of the rotary piston cylinder 40 drives a succeeding planetary gearing 44 with a planetary axle 46 and planet pinions 48. Therein, the planetary axle 46 of the planetary gearing 44 is fixedly connected to the housing 50 of the rotary piston cylinder 40. In contrast, the planet pinions 48 act on a toothed wheel 52 connected to the tandem axle housing 18. Thus, the torque of the rotary piston cylinder 40 is enhanced by the planetary gearing 44. Therein, the enhancement of torque can be in a range of 1:3 to 1:5. Further, one recognizes that the pressurized rotary piston cylinder 40 is connected to the hydraulic equipment of the vehicle or the control valve 34, respectively, through a pressure line 78. Further, one recognizes the arrangement of a pressure chamber 82 of the rotary piston cylinder assembly 38. The housing 50 of the rotary piston cylinder assembly 38 is connected to the axle housing 14 of the drive axle 12 by means of fasteners 80.

Figure 2:
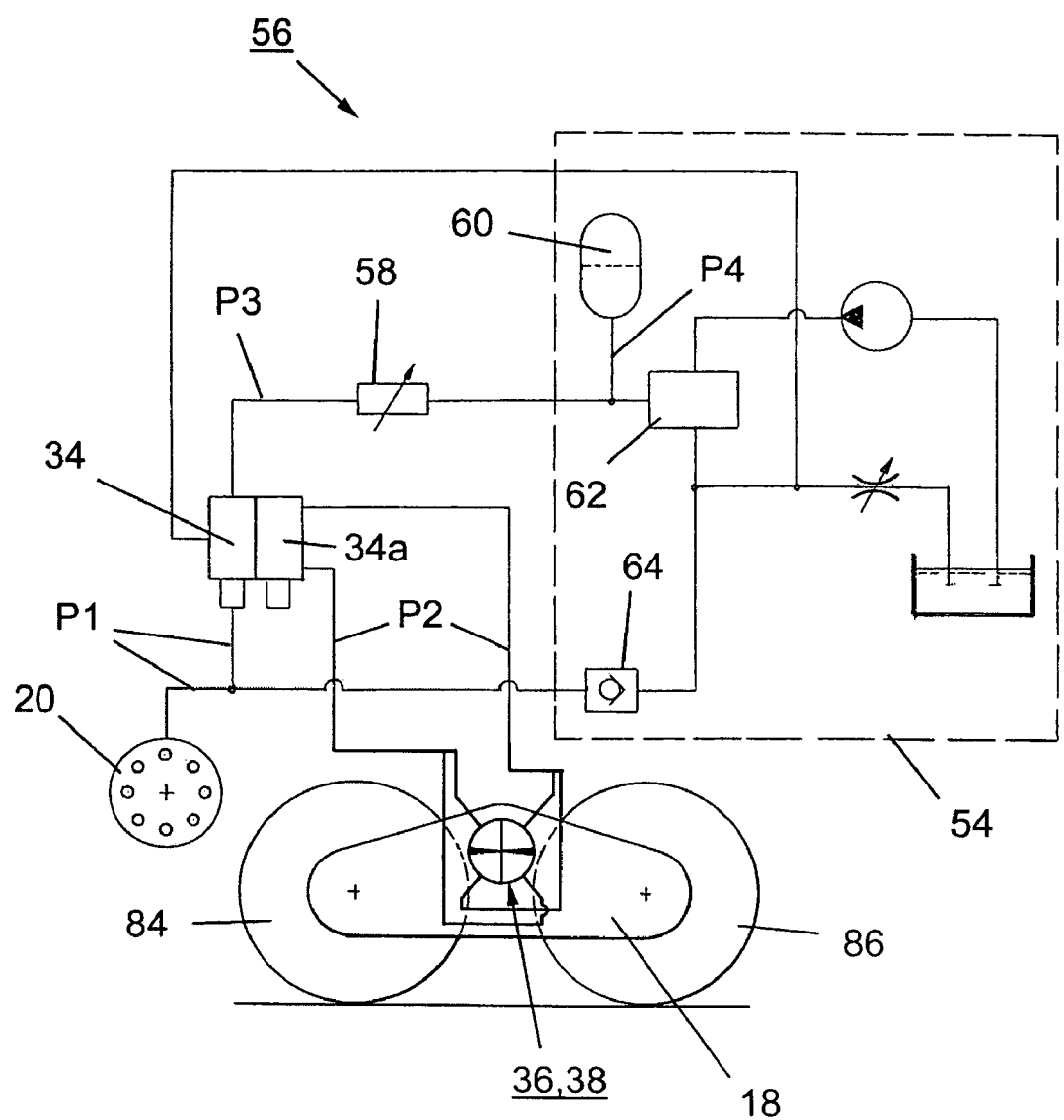
FIG. 2 a schematic representation of the device according to the invention for continuously regulating the erection of a tandem axle according to FIG. 1.

FIG. 2 shows a schematic representation of the device 10 according to the embodiment illustrated in detail in FIG. 1. One recognizes that the rotary piston cylinder assembly 38 or the compensating device 36, respectively, is connected to a hydraulic circuit 56 of a hydraulic pump 54 of the vehicle or the self-moving working machine. Therein, the control valve 34 is integrated in the hydraulic circuit 56. Therein, the control pressure P1 produced by the ball ramp assembly 20 and the piston 30 is introduced into the control valve 34, which is a proportional valve in the illustrated embodiment. Depending on P1, the pressure P3 supplied by the hydraulic system is modified, and the resulting pressure P2 is passed to the compensating device 36 or the rotary piston cylinder assembly 38, respectively. Therein, the pressure lines originating from the control valve 34 each terminate in corresponding mutually opposing pressure chambers of the rotary piston cylinder assembly 38. The pressure produced by the rotary piston cylinder assembly 38 is usually not sufficient to produce a torque with the rotary piston cylinder, which completely prevents an erection of the front or rear wheel of the tandem axle. The actually required torque is achieved through the planetary gearing 44 described in FIG. 1 and the toothed wheel 52 operatively connected thereto. The corresponding space of the rotary piston cylinder is pressurized through a control valve 34a according to the respective direction of travel.

Moreover, one recognizes that the hydraulic circuit 56 includes a pressure main storage 60 with the system pressure P4. Therein, the system pressure P4 can be modified or regulated, respectively, by means of a controlling and adjusting device 58 disposed between the pressure main storage 60 and the control valve 34. Therein, the controlling and adjusting device 58 especially serves for manually preadjusting the relative magnitude of the compensating torque for regulating the erection effect of the tandem axle. Furthermore, one recognizes that the hydraulic circuit 56 has a storage charging valve 62 as well as a check valve 64.

What is claimed is:

1. A device for continuously regulating the erection of a tandem axle of a vehicle or a self-moving working machine having a vehicle frame and at least one drive axle, wherein a drive tandem axle having a movable tandem axle housing is respectively disposed at the ends of the drive axle, and the torque introduced by the drive axle is mechanically distributed to the wheels disposed in the tandem axle housing through the drive tandem axle, wherein said the drive axle is coaxially connected to the drive tandem axle through a ball ramp device, and wherein the ball ramp device is comprised of a first ball ramp disk connected to an end of the drive tandem axle opposing an end of the drive axle, and a second ball ramp disk disposed in axially displaceable manner at the end of the drive tandem axle, and the distance L between the second ball ramp disk and the first ball ramp disk is increased by a torque of the drive tandem axle counteracting the drive torque, wherein the second ball ramp disk is operatively connected to a piston, and a pressure with a value of P1 is produced in a volume by the axial movement of the second ball ramp disk, wherein P1 is passed to a control valve, and the control valve controls the level of a system pressure P3 or P4 depending on P1, and a resulting pressure with a value of P2 serves for controlling a compensating device for achieving a compensating torque counteracting the erection effect.

2. The device according to claim 1, wherein said control valve is a controllable or non-controllable proportional valve.

3. The device according to claim 1, wherein said control valve is connected to a hydraulic circuit of a hydraulic pump of the vehicle or the self-moving working machine.

4. The device according to claim 3, wherein in the hydraulic circuit, at least one controlling and adjusting device for manually preadjusting the relative magnitude of the compensating torque for regulating the erection effect of the tandem axle is disposed at said control valve.

5. The device according to claim 4, wherein said controlling and adjusting device is a pressure-reducing valve.

6. The device according to claim 3, wherein said hydraulic circuit includes a pressure main storage with the system pressure P4.

7. The device according to claim 6, wherein said controlling and adjusting device is disposed between the pressure main storage and said control valve.

8. The device according to claim 1, wherein said compensating device is a rotary piston cylinder assembly, and wherein a housing of a pressurizable rotary piston cylinder is fixedly connected to an axle housing of said drive axle, and a rotationally movable piston of said rotary piston cylinder drives a succeeding planetary gearing having a planetary axle and planet pinions, wherein said planetary axle of the planetary gearing is fixedly connected to the axle housing or the housing of the rotary piston cylinder, and said planet pinions act on a toothed wheel connected to said tandem axle housing.

9. The device according to claim 1, wherein said compensating device is a rack rotary cylinder device with connected planetary gearing for introducing the torque of the compensating effect into the tandem axle.

10. The device according to claim 1, wherein said compensating device is comprised of two external cylinders, wherein the cylinders are each attached with one end to said tandem axle housing and with the other end to a chassis of the vehicle or the self-moving working machine.

11. A method for regulating the erection of a tandem axle of a vehicle or a self-moving working machine, wherein the method comprises the following steps:

a) introducing a drive torque through a drive axle and a coaxial drive tandem axle and mechanically distributing the introduced torque to the wheels disposed in a tandem axle housing, wherein said drive axle is connected to said drive tandem axle through a ball ramp device, and the ball ramp device is comprised of a first ball ramp disk connected to an end of said drive tandem axle opposing an end of the drive axle, and a second ball ramp disk disposed at the end of the drive tandem axle in axially displaceable manner;

b) measuring a torque of the drive tandem axle counteracting the drive torque by means of a pressure with a value of P1 produced by a piston, wherein the piston is operatively connected to the second ball ramp disk;

c) passing the pressure P1 to a control valve; and d) regulating the level of a system pressure P3 or P4 depending on P1 and introducing this resulting pressure with the value of P2 into a compensating device for achieving a compensating torque counteracting the erection effect.

12. The method according to claim 11, wherein said control valve is a proportional valve.

13. The method according to claim 11, wherein at least one controlling and adjusting device for manually preadjusting the relative magnitude of the compensating torque for regulating the erection effect of the tandem axle is disposed at the control valve, and the pressure P3 is produced by the controlling and adjusting device.

14. The method according to claim 11, wherein said compensating device is a rotary piston cylinder assembly with connected planetary gearing or a rack rotary cylinder device with connected planetary gearing or is comprised of two external cylinders, wherein the cylinders are each attached with one end to the tandem axle housing and with the other end to a chassis of the vehicle or the self-moving working machine, each for introducing the torque of the compensating effect into the tandem axle.

* * * * *

UNITED STATES PATENT AND TRADEMARK OFFICE
CERTIFICATE OF CORRECTION

PATENT NO.        : 7,258,182 B2
APPLICATION NO.   : 11/114588
DATED             : August 21, 2007
INVENTOR(S)       : Auer Page 1 of 1

It is certified that error appears in the above-identified patent and that said Letters Patent is hereby corrected as shown below:

On The Title Page delete The Assignee and insert the following:

(73) Assignee: NAF Neunkirchener Achsenfabrik AG, Neunkirchen (DE)

Signed and Sealed this

Twenty-fifth Day of December, 2007

JON W. DUDAS
*Director of the United States Patent and Trademark Office*